United States Patent [19]

Larkin

[11] Patent Number: 4,457,553
[45] Date of Patent: Jul. 3, 1984

[54] PORTABLE SHOWER FOR VAN OR CAMPER VEHICLE

[76] Inventor: William G. Larkin, 1243 Castlemont, San Jose, Calif. 95128

[21] Appl. No.: 447,456

[22] Filed: Dec. 6, 1982

[51] Int. Cl.$^3$ .............................................. B60P 3/34
[52] U.S. Cl. .................................... 296/160; 296/161; 296/163; 135/88; 135/114; 4/599; 4/602; 4/614; 4/617
[58] Field of Search ................................ 296/159–161, 296/163, 172, 176, 26; 135/88, 92, 114, 119, 903; 224/309, 312; 160/39; 4/599, 602, 612, 614, 615, 617

[56] References Cited

U.S. PATENT DOCUMENTS

| | | | |
|---|---|---|---|
| 1,104,314 | 7/1914 | Rench | 4/599 |
| 2,222,186 | 11/1940 | Sladkus | 160/39 |
| 2,282,362 | 5/1942 | Johnson | 135/902 |
| 2,870,774 | 1/1959 | Blosser | 135/88 |
| 3,707,977 | 1/1973 | Grady | 135/1 A |
| 3,743,345 | 7/1973 | Eckman | 135/88 |
| 3,923,336 | 12/1975 | Price, Sr. | 296/26 |
| 3,968,809 | 7/1976 | Beavers | 135/4 A |
| 4,010,973 | 3/1977 | Heinrich | 296/23 R |
| 4,099,534 | 7/1978 | Corbin | 135/4 A |

Primary Examiner—Robert R. Song
Attorney, Agent, or Firm—Thomas Schneck

[57] ABSTRACT

A portable shower mountable on a van or similar vehicle wherein a shower curtain is hung from a U-shaped frame which is adjustable in width and telescopes inwardly into parallel tubes mounted near opposite lengthwise rain gutters of a van roof. The parallel tubes are held in place by cross-tensioned straps, pulling against brackets secured to the rain gutters. An opaque shower curtain is suspended from the U-shaped frame by snap fasteners and has a lengthwise slide fastener near one end of the curtain for ingress and egress into the room formed by the curtain. A removable shelf is supported in the room from the rain gutter and supports a water bottle in proximity to the gutter for showering. A fabric self-supporting shower pan is provided over the ground beneath the shelf with the forward end of the pan hung by hooks from the rear bumper of the vehicle for draining the pan into a receptacle.

5 Claims, 16 Drawing Figures

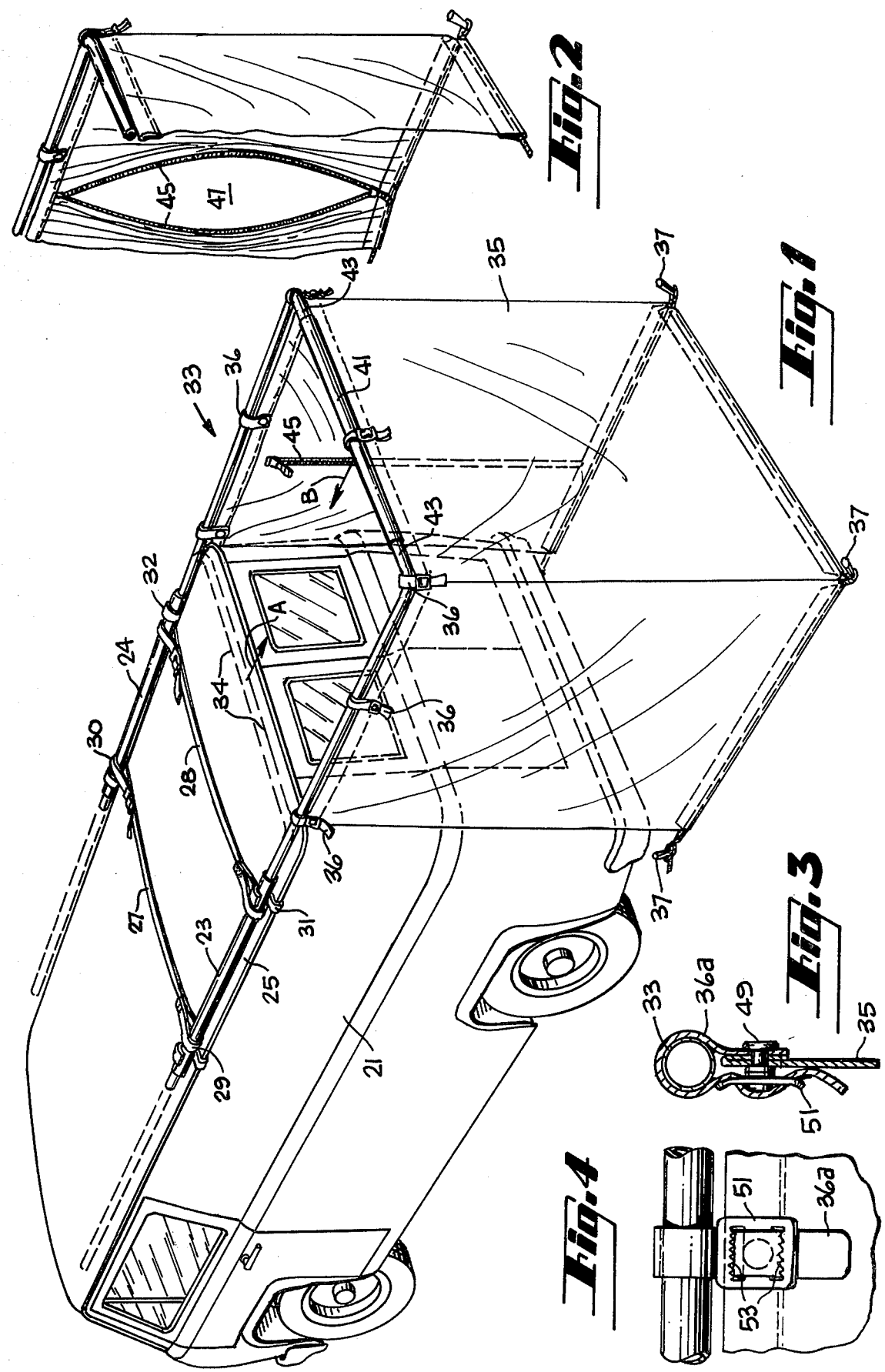

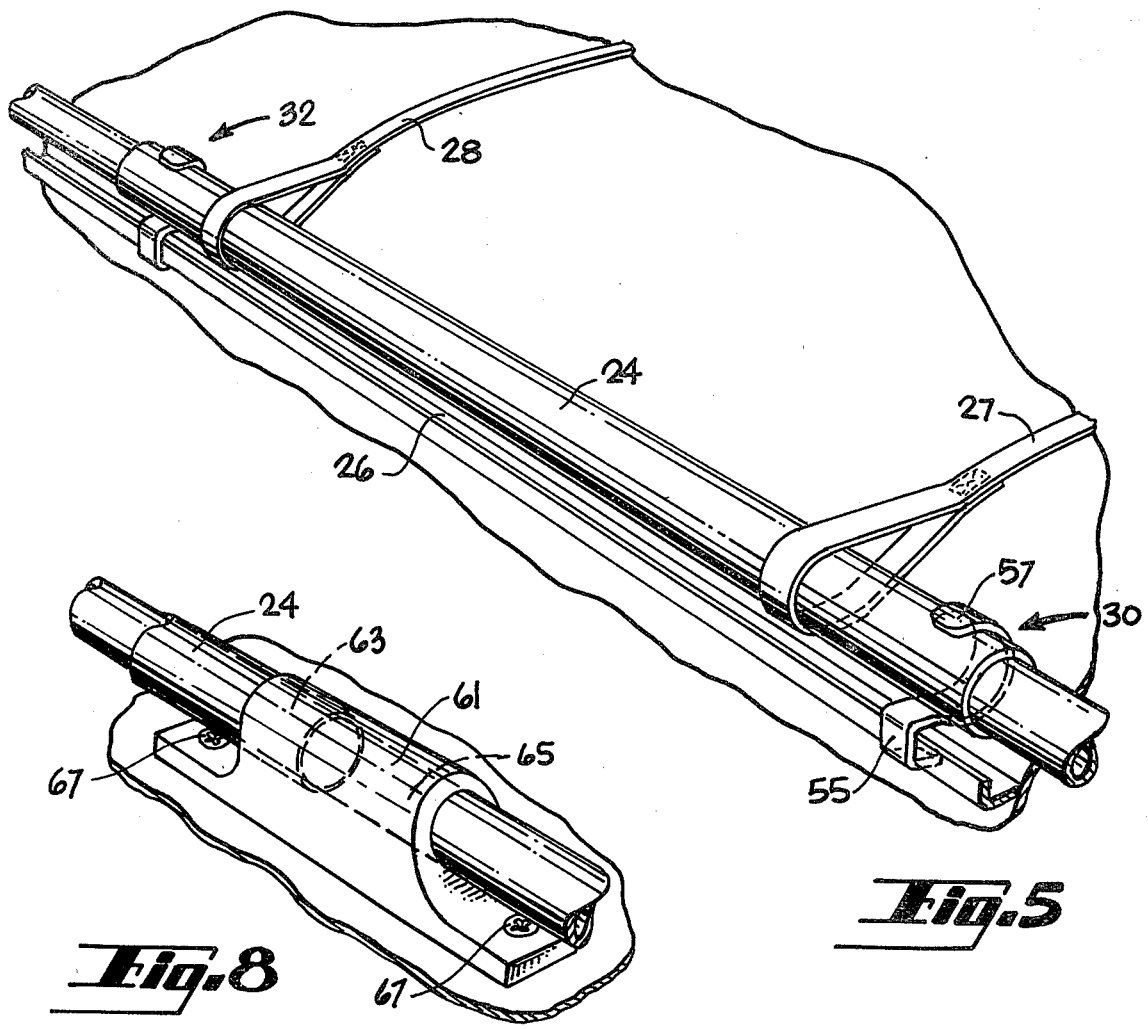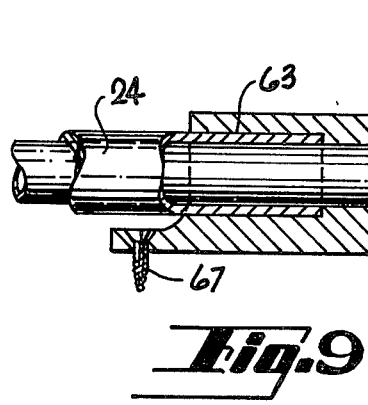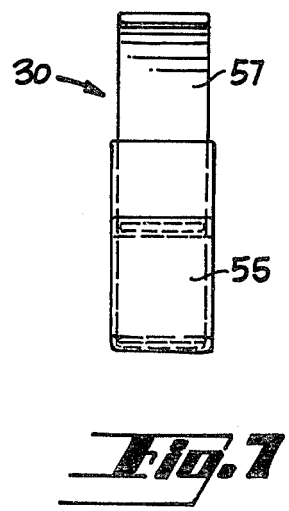

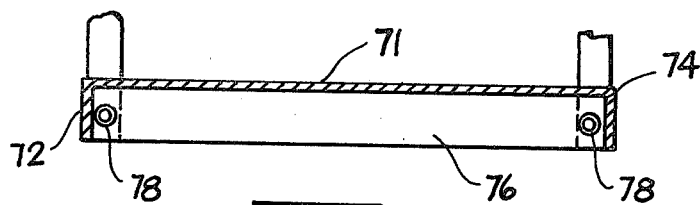
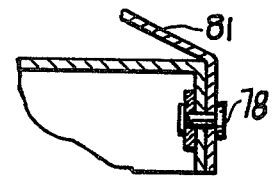
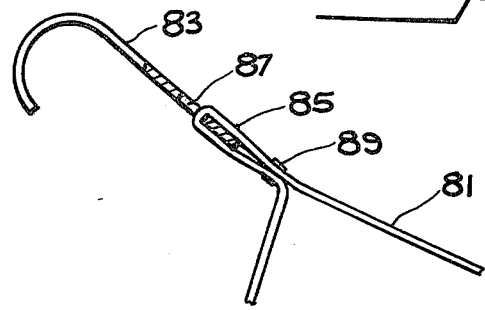
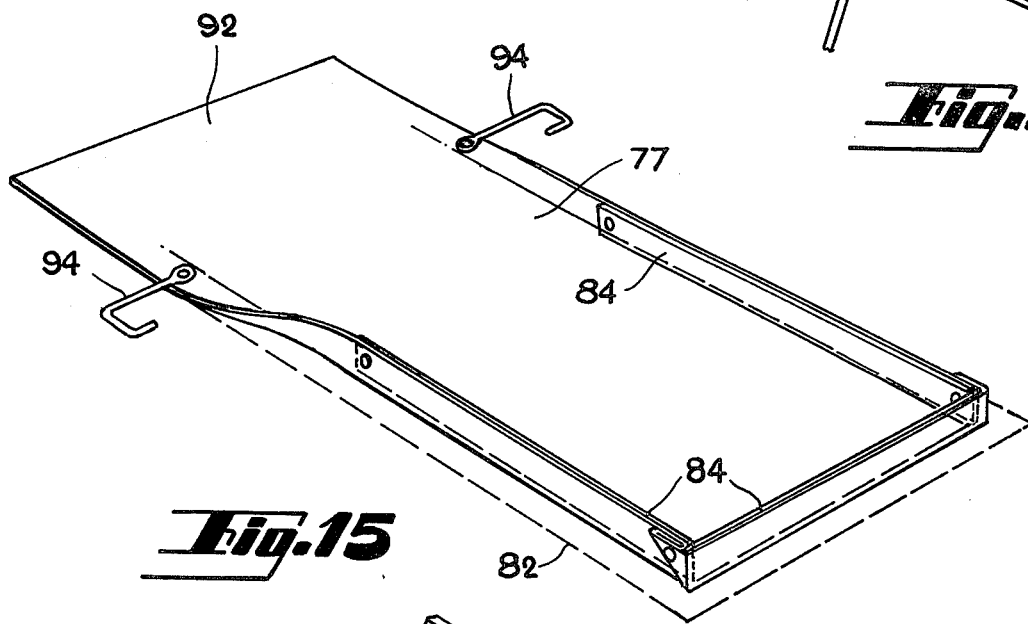
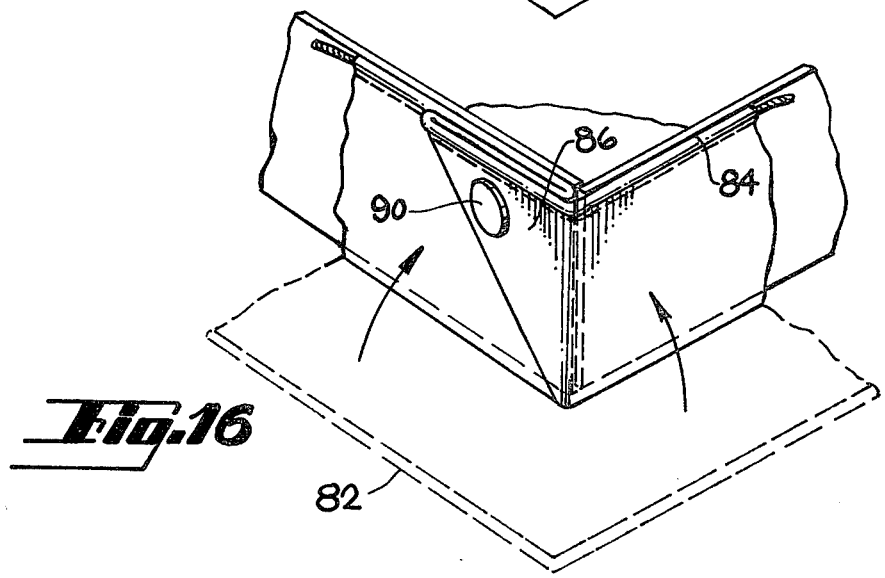

4,457,553

PORTABLE SHOWER FOR VAN OR CAMPER VEHICLE

DESCRIPTION

1. Technical Field

The invention relates to a closable exterior compartment for a land vehicle, such as a van or camper. The enclosure forms a room next to such a vehicle, with cooperating fixtures, for use as a shower.

2. Background Art

Tent enclosures for use in combination with a van are known. For example, in U.S. Pat. No. 3,968,809 a room-forming extension is shown. The room relies upon framework to support the room. In U.S. Pat. No. 3,923,336 a canvas room is shown which is supported by vertical and horizontal framework. Some of the framework includes telescoping pole members for ease of storage.

While various types of room-forming extensions for vans and campers are known, there is a need for a transportable add-on room for campers and vans especially adapted for showering. The popularity of vans as recreational vehicles has increased in recent years, displacing larger recreational vehicles which have become too expensive to operate for many vacationers. Accordingly, there is a need for many of the amenities of larger recreational vehicles in smaller vehicles such as campers and vans.

DISCLOSURE OF INVENTION

The present invention provides a shower enclosure for a van or similar vehicle featuring a pair of spaced-apart, parallel tubes mounted near opposite lengthwise rain gutters on the roof of a van. These parallel tubes support, in telescopic relation, a light weight, adjustable, U-shaped frame which can be telescoped outwardly such that the frame is supported in a cantilever manner. This cantilever support eliminates vertical frame members which characterized van room extensions of the prior art. A shower curtain of tentlike material is hung on the frame closing a space below the U-shaped frame. The shower curtain may be provided with an opening for ingress from outside the van. If the van has rear doors, the room may be entered directly from the van, in privacy.

The room includes a shelf which may be hung from a rear rain gutter of the van, supporting a water bottle for showering. A fabric shower pan is provided in the water runoff area. The shower pan is characterized by a rearward upturned edge for forming a water basin and a flat forward edge such that water may be drained forwardly toward the van bumper and a water receptacle placed in proximity to the bumper.

BRIEF DESCRIPTION OF THE DRAWINGS

FIG. 1 is a perspective view of the portable shower of the present invention, shown in combination with a van.

FIG. 2 is a cutaway perspective detail showing the manner of entry into the room illustrated in FIG. 1.

FIG. 3 is a sectional view of the manner of supporting the wall for the room illustrated in FIG. 1.

FIG. 4 is a front view of the support means illustrated in FIG. 3.

FIG. 5 is a perspective cutaway view of an edge portion of the van roof, particularly illustrating the mounting of a tube which supports the room illustrated in FIG. 1.

FIG. 6 is a side sectional view of a tube-holding bracket, illustrated in FIG. 5.

FIG. 7 is a front view of the bracket illustrated in FIG. 6.

FIG. 8 is a cutaway perspective view of a bracket for supporting one of the parallel tubes on the roof of a vehicle, an alternate embodiment of the apparatus illustrated in FIG. 5.

FIG. 9 is a side cutaway view of the bracket illustrated in FIG. 8.

FIG. 12 is a sectional view of the shelf of FIG. 11 taken along lines 12—12.

FIG. 13 is a detail of the means of attaching straps to the shelf of FIG. 12, taken along lines 13—13 in FIG. 11.

FIG. 14 is a side sectional view of a hook for securing the shelf of FIG. 11 to the roof of a van.

FIG. 15 is a perspective view of a shower pan, as illustrated in FIG. 10.

FIG. 16 is an enlarged perspective view of a corner of the shower pan illustrated in FIG. 15, particularly showing the manner of construction.

BEST MODE FOR CARRYING OUT THE INVENTION

Figure 10:
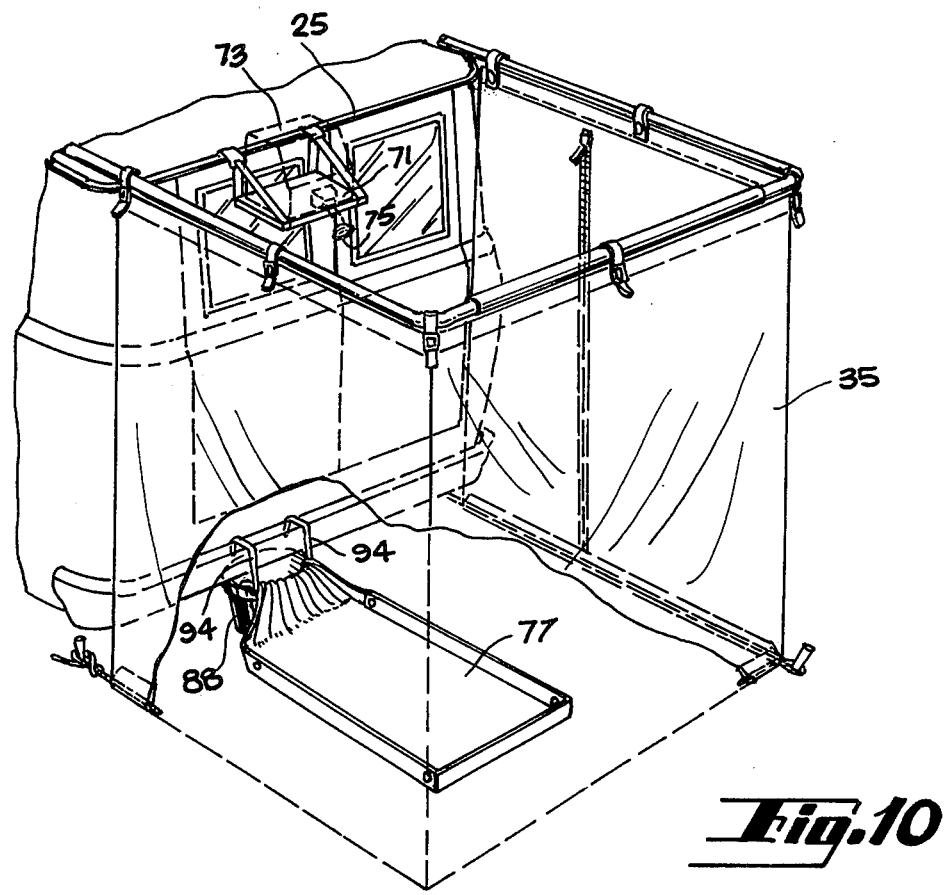
FIG. 10 is a perspective view of the room illustrated in FIG. 1, together with shower fixtures.

The present invention contemplates transportation of a portable shower in vehicles which are used for recreation purposes, such as vans. A van 21 is illustrated in FIG. 1, having conventional design. The present invention has expansion features so that the room framework will fit most vans currently manufactured. Support for the room is provided by a pair of spaced-apart, parallel tubes 23 and 24, carried on the roof of the van. The two parallel tubes are preferably secured to rain gutter 25 and a corresponding gutter on the opposite side of the van, not shown. The parallel tubes 23 and 24 are held in place by opposed tensioning, using brackets 29, 31, 30 and 32 tending to restrain the tubes from moving toward the center of the roof on the one hand and straps 27 and 28 tending to pull the tubes 23 and 24 toward the center of the roof, against brackets 29 and 30 for strap 27 and brackets 31 and 32 for strap 28. One of the advantages of the fabric straps 27 and 28 is that the straps can pass over or pass through existing roof structures, such as racks or rails which are sometimes placed on van roofs for supporting loads.

The telescoping tubes provide cantilever support for a U-shaped frame member 33 which in a storage position is carried fully telescoped inwardly with respect to the tubes so that the rearward portion of the frame is carried in a position indicated by the dashed lines 34. For use, the U-shaped frame member is extended rearwardly in the direction of arrow A to the position shown in FIG. 1. The frame supports an opaque shower curtain 35 which is hung from the U-shaped frame 33, using tie straps 36 which loosely fit about the U-shaped frame. The shower curtain 35 preferably, but not necessarily, extends down to ground level so that it may be anchored in place by stakes 37.

The U-shaped frame is laterally extendable to fit most vans because a rear piece 41 has a slightly larger diameter than two L-shaped pieces 43 which fit into piece 41.

As a means of ingress and egress, a lengthwise slide fastener 45 is provided on a segment of the shower curtain near one edge. The slide fastener may be opened from either the inside or outside of the room formed by curtain 35.

For storage, the shower curtain is removed from the frame by unsnapping straps 36, then sliding the frame toward the front of the vehicle as indicated by the arrow B. With reference to FIG. 2, the manner of opening and closing the room may be seen. The slide fastener 45 provides an opening 47 intended to be temporary and easily operated.

In FIG. 3, it may be seen that the shower curtain 35 has a rivet 49 which connects a strap 36a to the shower curtain. The strap is intended to encircle the U-shaped frame 33 and be connected to the rivet 49 by means of a snap buckle 51 which allows adjustment of the strap 36a about the frame member. By providing a snap buckle for fastening to rivet 49, the strap 36a can be put into place in a matter of seconds. The front view of FIG. 4 shows that snap buckle 51 is of known design, having teeth 53 to keep strap 36a in place when tension is applied to the shower curtain, as by pulling.

FIG. 5 shows the manner of securing the parallel tubes in place. A parallel tube 24 is positioned adjacent to gutter 26. The bottom portion 55 of bracket 30 is snapped about rain gutter 26 while the upper portion 57 of the bracket is snapped about tube 24 from the opposite direction. In order to maintain tube 24 in place a tensioning strap 27 pulls the tube from the opposite direction, holding it in place. Tension is applied by means of buckles 20 and 22 in FIG. 1 which allow application of belt tension pulling tubes 23 and 24 toward each other. Similarly, the rearward bracket 32 encompasses tube 24 and also encircles the rim of rain gutter 26. Another tensioning belt 28 keeps the tubes securely within bracket 32.

With reference to FIGS. 6 and 7, one of the brackets 30, holding a telescoping tube in place may be seen. The bracket consists of a lower C-shaped region 55 which is intended to fit about a rain gutter of a van. The entire bracket is metal, but the lower portion may be rubber coated to prevent scratching automotive finishes. An upper C-shaped region 57 is connected to the lower C-shaped region that faces in the opposite direction. Bracket 30 is similar, if not identical to, a bracket used for hanging pipe or the like.

FIGS. 8 and 9 illustrate an alternative means for securing the tube 24 to the top of a van or other vehicle, especially one not having roof gutters. For such a situation, a special bracket means has been devised. This bracket means includes a mass of material 61 having a continuous bore therethrough. The bore has first and second diameter bore portions, including a larger portion 63 for accommodating a rearward end of tube 24 and a narrower bore portion 65 which has a diameter just slightly larger than the U-shaped frame member 33. The two fore portions are axially aligned and adjacent. The larger bore portion 63 seats an end of the tube, while the smaller bore portion 65 allows free sliding of the frame member in and out of the tube. The bracket is aligned with a similar bracket toward the front or cab of a vehicle, except that the front bracket is oriented in the reverse direction, with the larger bore portion facing rearwardly so that the opposite end of tube 24 can be held in place. The bracket is fastened to the roof of a vehicle by means of screws 67. This differs from the mounting means illustrated in FIG. 5 which is completely removable from the roof of a vehicle, without screws or other mounting devices which permanently alter the vehicle.

FIG. 10 illustrates the manner in which the room of FIG. 1 is utilized as a shower. A removable shelf 71 is supported from gutter 25 and a conventional water bottle 73 with a shower nozzle 75 is disposed on the shelf. A self-supporting shower pan 77 is used to catch water for draining into a receptable 88 or to a location away from the van. Receptacle 88 is useful in preventing pollution of local water supplies, as well as for keeping the showering area dry. The shower enclosure of the present invention may be entered not only through the slide fastener in the shower curtain, but also directly from one of the rear doors of a van, providing the van has such doors. The water receptacle, removable shelf and shower pan may be placed in front of one of the doors, such as the left door in FIG. 10, while the right-hand door is unblocked, permitting entry of the enclosure through the righthand door.

Figure 11:
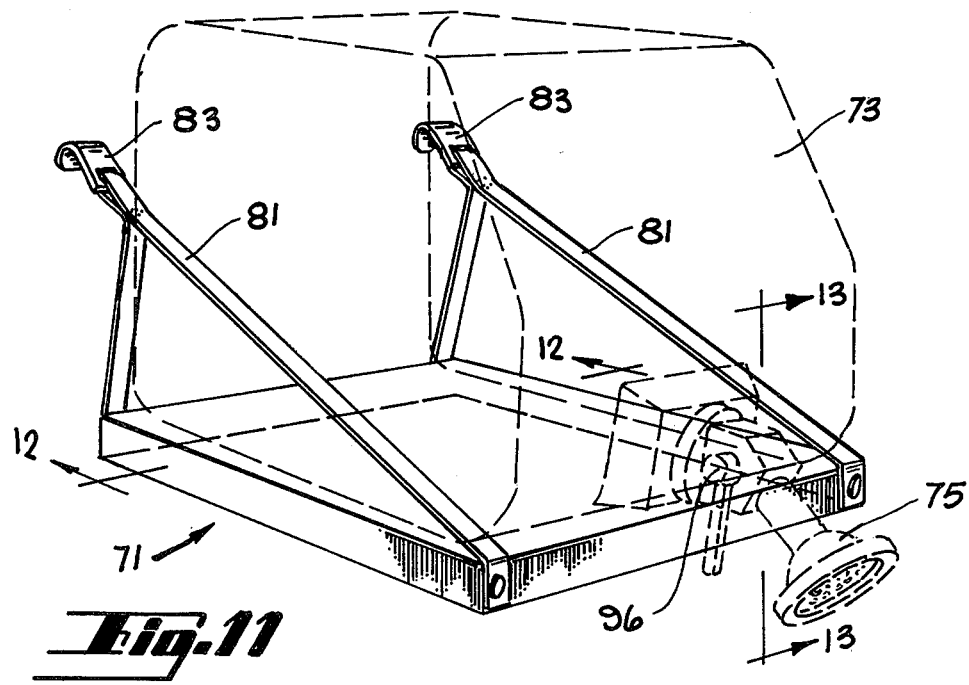
FIG. 11 is a perspective detail view of a water bottle shelf illustrated in FIG. 10.

FIG. 11 shows the details of the support mechanism for the shelf 71 including fabric straps 81 and gutter hooks 83. Straps 81 are attached to front and back sides of the tray to provide secure support for bottle 73. Nozzle 75 has a flow control valve 96.

FIG. 12 shows that shelf 71 has a folded metal design with edges 72, 74 and 76 acting as skirts extending downwardly from the shelf, allowing rivets 78 to be attached to the skirts, without diminishing the surface area of the shelf. FIG. 13 shows the detail of insertion of rivet 78 for holding strap 81.

In FIG. 14, the upper portion of strap 81 is shown to be fastened to a metal or plastic hook 83 by means of a loop 85 passing through a hole 87 in the hook. The loop is maintained by a rivet 89.

FIG. 15 illustrates the drain pan 77 which, like the shower curtain 35, may be made of tent material, such as reinforced nylon or canvas. The corners of the shower pan have upturn and folded edges which are formed from a flat sheet indicated by the dashed line 82. The upturned edges and sides are held in place by stiffeners 84 along the top edge of the pan. An opposite end 92 of the pan is left flat so that it can be gathered into a funnel shape for guiding water into the receptacle. The lateral edges of the shower pan may be provided with hooks 94 so that the shower pan may be elevated to the bumper level for trapping water in the shower pan while showering. To drain water from the pan, the rear corners of the shower pan are lifted, causing water to flow forwardly toward the receptacle.

FIG. 16 shows a detail of the corner construction whereby material forms a lap 86 held in place by a rivet 90. The edges of the shower pan should be turned up so as to form a barrier approximately four inches high. The ground area covered by the shower pan should be sufficient to catch most of the water from the nozzle. By providing extra length to the shower pan, the pan may be drained into a receptacle or toward another area away from the room as necessary.

An advantage of the present invention is that the entire apparatus may be disassembled and stored relatively flat inside of a van when not in use. Alternatively, on a trip, the tubes and U-shaped member may be left in place, with only curtain, shower pan, receptacle and shelf removed. The time for assembling the portable shower of the present invention is just a few minutes.

I claim:

1. A shower enclosure for a van or the like of the type having rain gutters about the roof periphery comprising,
   - a pair of spaced apart, parallel tubes mounted near opposite lengthwise rain gutters of a van roof, said tubes supporting, in telescopic relation, a lightweight, U-shaped frame which, when telescoped outwardly, is supported in cantilever manner,
   - a shower curtain of tent-like material having dimensions adapted to hang on said U-shaped frame and closing a space extending downwardly from said U-shaped frame at least several feet and extending laterally around said U-shaped frame, and
   - bracket means for mounting said parallel tubes with respect to opposite lengthwise rain gutters of the van roof, said bracket means comprising a plurality of brackets having a lower C-shaped region disposed about the outside rim of said rain gutters and an upper C-shaped region connected to the lower C-shaped region but facing in the opposite direction, the upper C-shaped region disposed about a tube, and a pair of adjustable tensioning straps laterally spanning said roof having ends connected to opposite tubes, said straps tensioned to hold the tubes in the brackets and the brackets in the rain gutters.

2. The shower enclosure of claim 1 further comprising a fabric shower pan having a generally flat central portion, a side and rearward upturned edge for forming a water basin and a flat forward edge.

3. The shower enclosure of claim 1 wherein said U-shaped member comprises two parallel L-shaped members facing each other connected to a base member, the base member being telescopically extendable relative to the parallel member for use on vehicles of differing widths.

4. The shower enclosure of claim 2 wherein said shower pan has hook means for attachement to a van bumper.

5. A shower enclosure for a van or the like of the type having rain gutters about the roof periphery comprising,
   - a pair of spaced apart, parallel tubes mounted near opposite lengthwise rain gutters of a van roof, said tubes supporting, in telescopic relation, a lightweight, U-shaped frame which, when telescoped outwardly, is supported in cantilever manner,
   - a shower curtain of tent-like material having dimensions adapted to hang on said U-shaped frame and closing a space extending downwardly from said U-shaped frame at least several feet and extending laterally around said U-shaped frame, and
   - bracket means for mounting said parallel tubes with respect to edges of the van roof, the bracket means comprising two bracket pairs, each pair including a first mass of material having a bore therethrough, said bore having first and second diameter bore portions, one axially aligned and adjacent the other, the larger bore portion seating an end of one of said tubes, the smaller bore portion allowing part of said U-shaped frame to pass therethrough and a second mass of material having a bore of the first diameter only extending partially therethrough, the two first diameter bore portions facing each other in axial alignment for holding opposite ends of said tube, said brackets having fastener means for mounting on a van roof.

* * * * *